Aug. 16, 1966   J. E. BORAH   3,266,094
MOLDING APPARATUS
Filed Feb. 29, 1960   8 Sheets-Sheet 1

FIG. 1

INVENTOR.
JOHN E. BORAH
BY M. A. Hobbs
ATTORNEY

FIG. 2

Aug. 16, 1966    J. E. BORAH    3,266,094
MOLDING APPARATUS
Filed Feb. 29, 1960    8 Sheets-Sheet 3

FIG. 3

INVENTOR.
JOHN E. BORAH
BY M. A. Hobbs
ATTORNEY

Aug. 16, 1966  J. E. BORAH  3,266,094
MOLDING APPARATUS

Filed Feb. 29, 1960  8 Sheets-Sheet 5

INVENTOR.
JOHN E. BORAH
BY M. A. Hobbs
ATTORNEY

Aug. 16, 1966 J. E. BORAH 3,266,094
MOLDING APPARATUS

Filed Feb. 29, 1960 8 Sheets-Sheet 7

INVENTOR.
JOHN E. BORAH
BY M. A. Hobbs
ATTORNEY

Aug. 16, 1966  J. E. BORAH  3,266,094
MOLDING APPARATUS

Filed Feb. 29, 1960  8 Sheets-Sheet 8

INVENTOR.
JOHN E. BORAH
BY M. A. Hobbs
ATTORNEY

# United States Patent Office 3,266,094
Patented August 16, 1966

3,266,094
MOLDING APPARATUS
John E. Borah, 815 Mishawaka Ave., Mishawaka, Ind.
Filed Feb. 29, 1960, Ser. No. 11,533
11 Claims. (Cl. 18—16)

The present invention relates to a press, and more particularly to a mold apparatus used in conjunction with presses for molding products of rubber, rubber-like and plastic materials.

In molding products and articles of rubber and rubber-like material in transfer molds, the plates of the mold are assembled and closed with the moldable material therein, and the assembled mold is inserted in a hydraulic or pneumatic press where it is placed under the required pressure and temperature for extruding the material through the sprues into the mold cavity and thereafter curing the materials in its final shape. The conventional transfer mold consists of a plunger plate which contacts the upper platen on the cross head of the press, a pot well plate in which the plunger compresses the moldable material, one or more center plates in which the principal part of the mold cavity is located, and a bottom plate which may contain a portion of the mold cavity and possibly a core for the mold and which rests on the lower platen on the base or ram of the press. The cavities in the center plate are connected to the pot well plate by one or more sprues through which the moldable material is injected into the cavities when the plunger is forced into the pot well by the closing of the press. This molding operation is performed under relatively high temperatures and pressures and the plates and other parts of the mold become hot and often adhere to the rubber and the adjacent parts. When the rubber is cured, the press is opened and the assembled mold plates, which are often large, heavy and hard to handle, must be removed from the press, pried open, and mold plates separated while the plates are still hot, so that the molded articles can be removed from the cavities and another charge of moldable material inserted in the pot well. The difficulty of manually handling and opening and closing the molds in molding rubber articles under these conditions has in the past limited the size and weight, and hence the capacity of the molds and has resulted in a high turn-over in press operating personnel as well as an initial and constant high labor cost factor in the overall operation.

Difficulty in handling the mold plates of compression type molds is frequently encountered, particularly when the articles being produced in the mold are relatively long and/or thick, requiring large, thick mold plates which are heavy and hard to insert and remove from a press. The difficulty in manually handling the assembled mold in inserting and removing it from the press and in assembling and disassembling the mold plates has often limited the number of cavities to only a few and rendered the molding operation laborious, time consuming and uneconomical.

It is therefore one of the principal objects of the present invention to provide a semi-automatic mold opening and closing apparatus which can be mounted on and operated by the press, and which can be handled by the operator with such ease that the size of the mold and mold plates and parts are limited only by the size and capacity of the press in which the apparatus is mounted.

Another object of the invention is to provide a mold apparatus for producing articles of rubber and rubber-like material which can be readily installed in a press and operated semi-automatically to assemble the plates and parts of the mold as the press is closed after moldable material has been inserted therein, and which operates to separate the mold plates automatically as the press is opened, releasing the plate or plates in which the filled mold cavities are located so that they can be easily removed from the press and the molded articles readily removed from the cavities therein.

Still another object of the present invention is to provide a mold apparatus for forming rubber products and articles which can be easily installed on conventional or standard presses without any substantial modifications or changes being made in the press, and which can be installed on presses already in service without disassembling the press or changing its normal operation.

A further object is to provide a mechanism for use in conjunction with transfer and compression type molds for producing rubber articles and the like, in which the mold plate with the cavities containing the molded articles can be removed mechanically from the press separately from the remainder of the mold plates and then inverted so that the molded articles will either fall of their own accord from the cavities or can easily be pushed therefrom into a receiving container or conveyor without any individual handling of the articles.

Another object of the invention is to provide a mold apparatus of the aforesaid type which can be adapted to presses of different makes and sizes and which includes a self-aligning feature for the operating members of the several mold plates and parts.

In some types of molded rubber and plastic articles, an insert, such as a metal ring, chain or spring, is molded in the article by placing the insert in the mold cavity and then forming the articles around the insert. An example of articles and molds of this type is found in my copending application Serial No. 1,924, filed January 12, 1960, now U.S. Patent No. 3,095,611, issued July 2, 1963. In the use of molds having a large number of small cavities for manufacturing the articles, insertion of the inserts in the cavity can often be a tedious, time-consuming and unpleasant operation, particularly if the mold part containing the cavity in which the insert is placed can not be removed from the press. It is therefore another one of the objects of the present invention to provide a mechanism for easily and readily moving the mold plate containing the cavities in which the inserts are to be placed outside the press independently of the remaining plates of the mold.

Additional objects and advantages of the present invention will become apparent from the following description and accompanying drawings, wherein.

Figure 1:
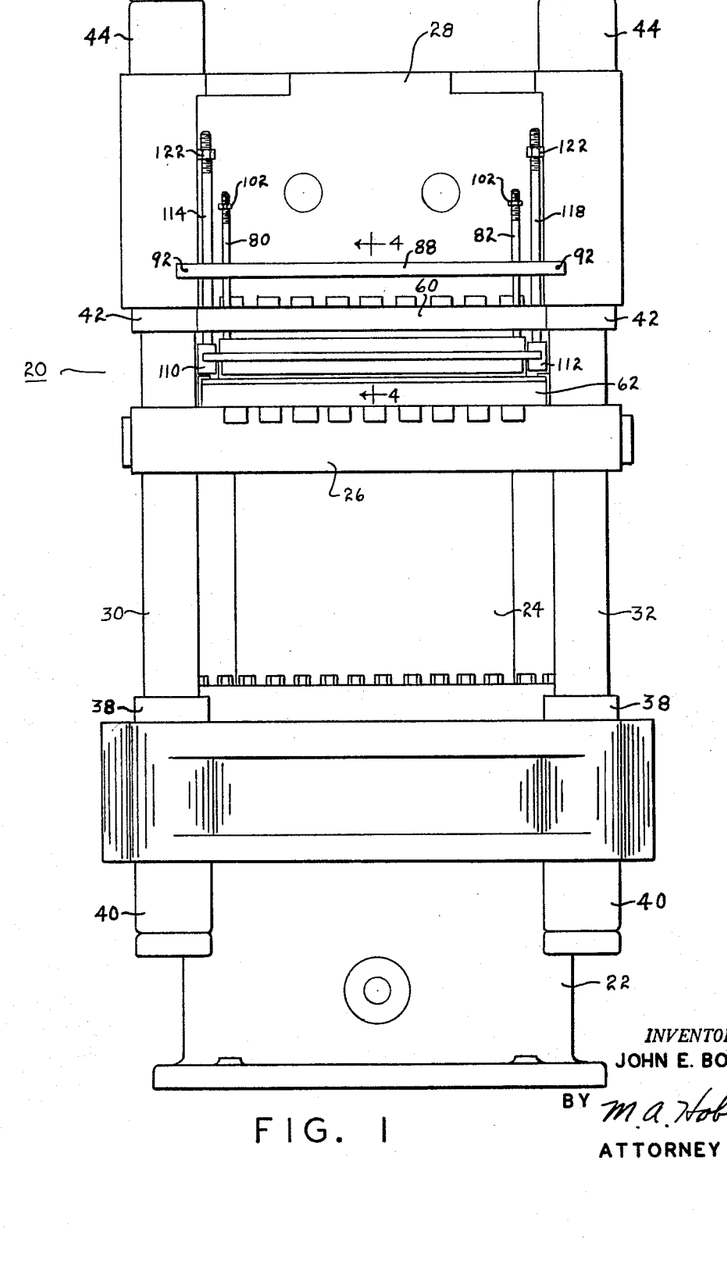
FIGURE 1 is a front elevational view of a conventional hydraulic press having mounted therein my new type of mold apparatus, the press and mold being shown in closed position.
Figure 3:
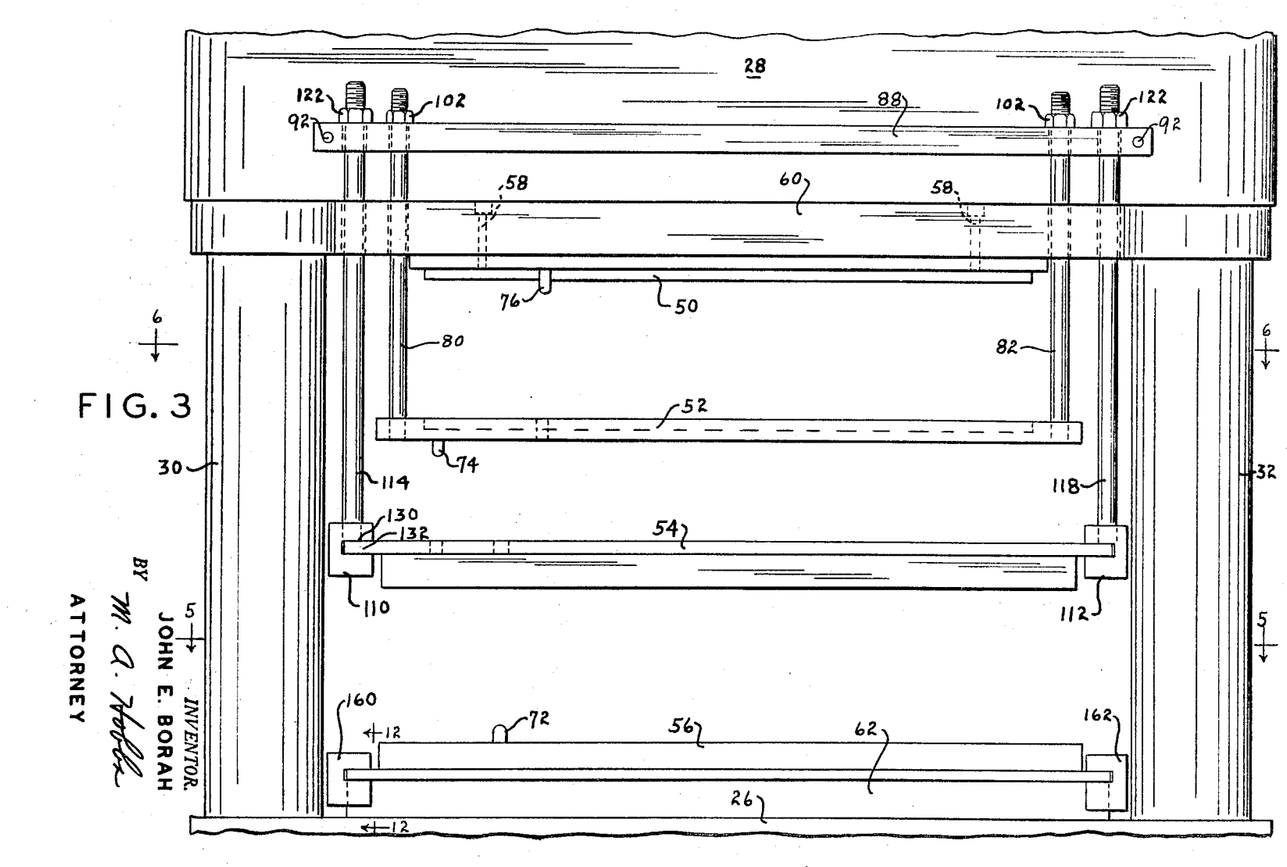
FIGURE 3 is an enlarged fragmentary elevational view of the press and present mold apparatus, showing the press and mold in fully opened position.
Figure 4:
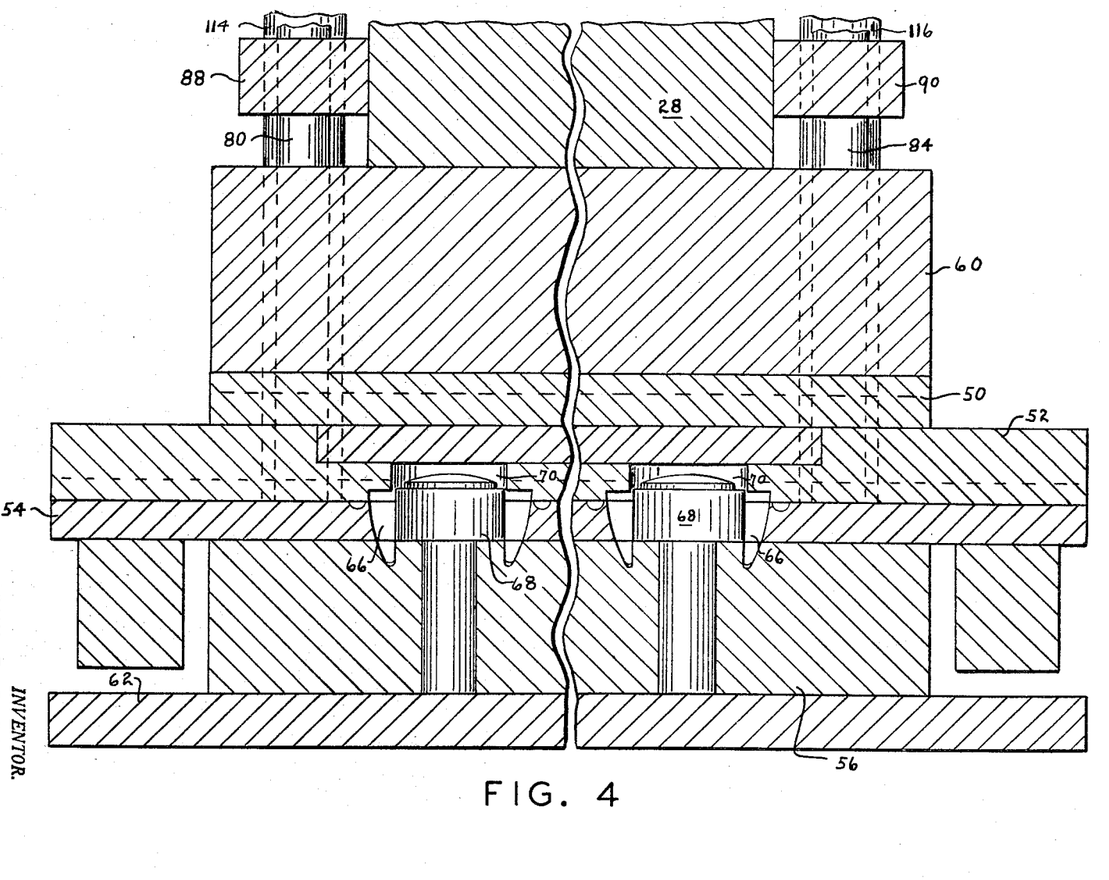
FIGURE 4 is an enlarged fragmentary vertical cross sectional view through two mold cavities of an article of a type suitable for production in the present mold apparatus, the section being taken on line 4—4 of FIGURE 1.
Figure 5:
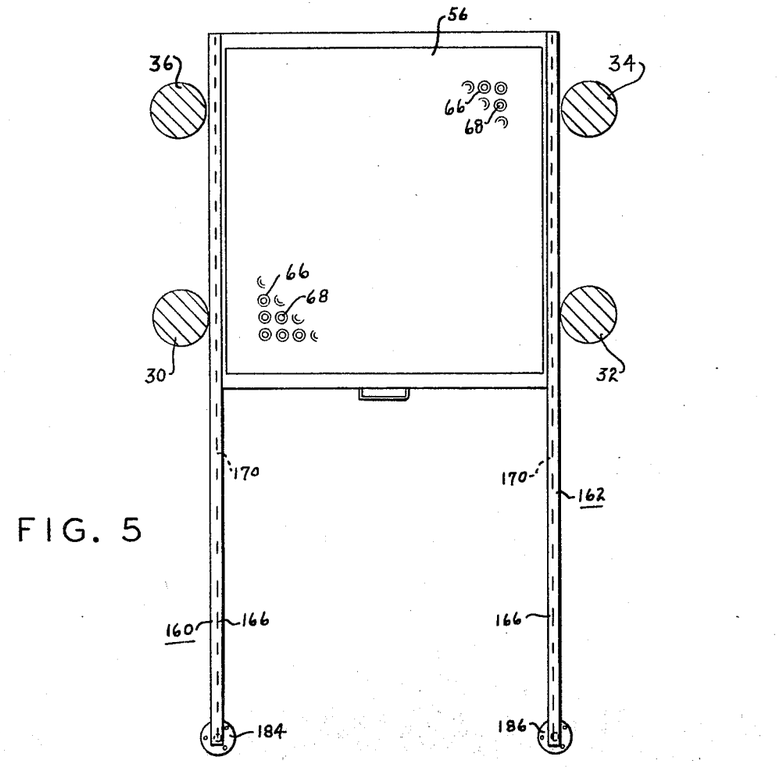
FIGURE 5 is a horizontal cross sectional view of the press and mold apparatus shown in the preceding figures, taken on line 5—5 of FIGURE 3.

Referring more specifically to the drawings and to FIGURES 1 and 3 in particular, numeral 20 designates generally a hydraulic press including a base 22 containing the hydraulic cylinder with ram 24, ram plate 26, press head 28 and four corner posts or tie rods 30, 32, 34 and 36 extending through the enlarged upper end of base 22 and head 28 and being rigidly secured at the lower and upper ends to the base and head by collars 38 and jam nuts 40 at the base, and collars 42 and jam nuts 44 at the head. Ram plate 26 is secured to the upper end of ram 24 and is provided at the corners with bosses journalled on the tie rods. The press shown in the drawings is considered for the purpose of the present description as a conventional hydraulic press controlled and operated by well known hydraulic equipment, including a supply tank, electric driven pressure pump, and standard control valves and relays (not shown). The type of press and the details in construction shown are included only to fully illustrate the construction and operation of the present mold apparatus, said apparatus being readily adaptable to various types of hydraulic presses including the well known slab type presses.

A transfer mold for producing gaskets having a metal insert, of the type disclosed and claimed in my above mentioned copending application, is shown to illustrate one type of mold adapted for operation by my apparatus. Briefly, the mold consists of a plunger plate 50, pot well plate 52, center plate 54, and bottom plate 56, the plunger plate being secured by bolts 58 to the underside of upper platen 60 and the bottom plate being slidably mounted on lower platen 62 in a manner to be more fully described hereinafter. The upper and lower platens are secured to the head and ram plate, respectively, and contain passages for circulating steam or other hot fluid therethrough to maintain the plates of the mold at the required temperature for proper molding and curing. The mold cavity 66 for producing the gaskets is disposed in the lower portion of the pot well plate 52 of the mold, center plate 54 and the upper part of the bottom plate. The core 68 is secured to the bottom plate and projects upwardly into the cavity and the moldable material is injected into the cavity through sprue 70 in the bottom of the spot well. After moldable material has been placed in the pot well, the mold is closed and placed under pressure, causing the moldable material to flow through sprue 70 into the mold cavity. The mold is then maintained under pressure at the elevated temperature for sufficient time to permit the rubber in the cavity to cure, and all the plates of the mold are then opened, all four sections thereof separated, and the molded articles removed from the cavities in the center plate where they remained after the mold was opened. A plurality of pins 72 mounted in bottom plate 56 and extending into holes in center plate 54 align those two plates when the mold is being closed; a plurality of pins 74 in the bottom of pot well plate 52 and extending into holes in the center plate align those two plates; and a plurality of pins 76 in plunger 50 and extending into holes in the pot well plate align those two plates when the mold is approaching fully closed position. The manipulation of the mold and the sequence of operation thereof just described are standard and normally are performed manually, with the mold being necessarily limited to a size, often with only a small number of cavities, capable of being handled physically by one or two press operators. The present novel apparatus makes the operations semi-automatic and permits a single operator to operate one or more presses, as well as eliminating lifting of heavy mold plates and minimizing the physical manipulating of the plates by the operator.

Figure 2:
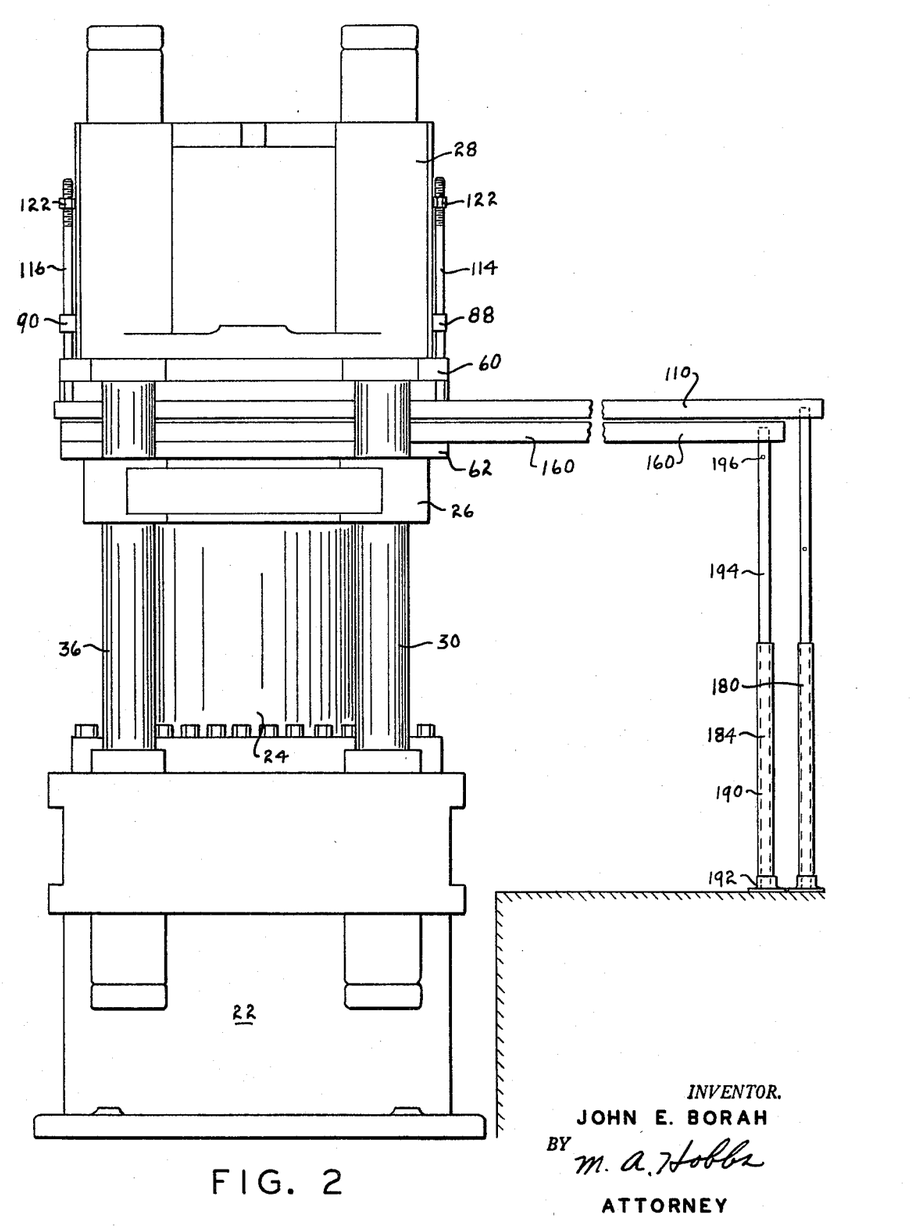
FIGURE 2 is a side elevational view of the press shown in FIGURE 1 with the press and mold being shown in closed position.
Figures 7, 8, 9:
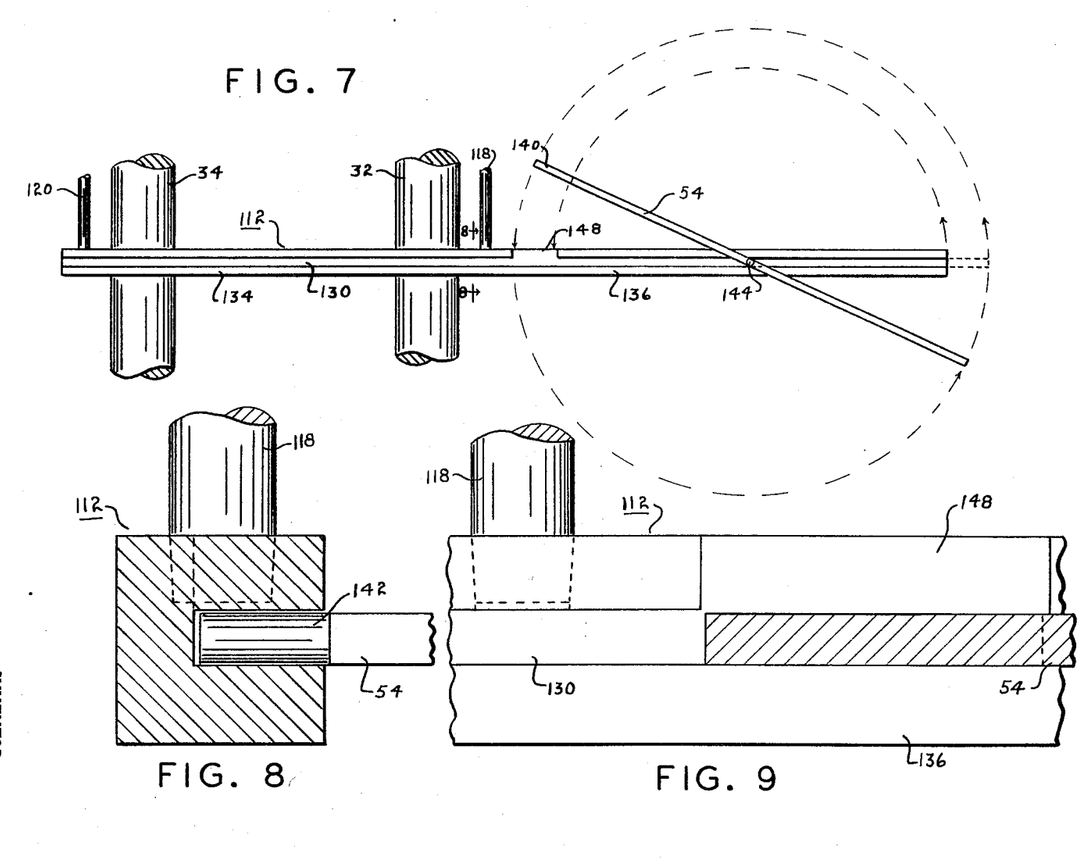
FIGURE 7 is a fragmentary vertical cross sectional view of the press and mold apparatus, taken on line 7—7 of FIGURE 6, illustrating the manner in which the mold section containing the final molded articles is removed from the press and inverted for the purpose of removing the articles from the cavities.
FIGURE 8 is an enlarged vertical cross sectional view of one of the tracks on which the removable mold section is withdrawn from the press preparatory to being inverted for the discharge of the molded articles from the mold cavities, said section being taken on line 8—8 of FIGURE 7.
FIGURE 9 is a fragmentary elevational view of one portion of the track on which the removable mold section is withdrawn from the press preparatory to being inverted, showing a portion of the mold section in cross section.
Figure 10:
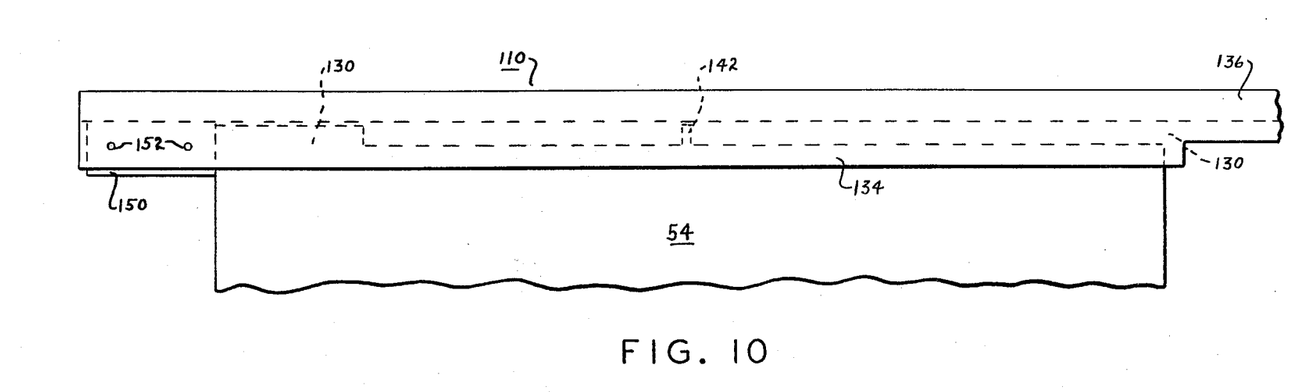
FIGURE 10 is an enlarged fragmentary plan view of a portion of a rail forming a part of the present apparatus.
Figure 11:
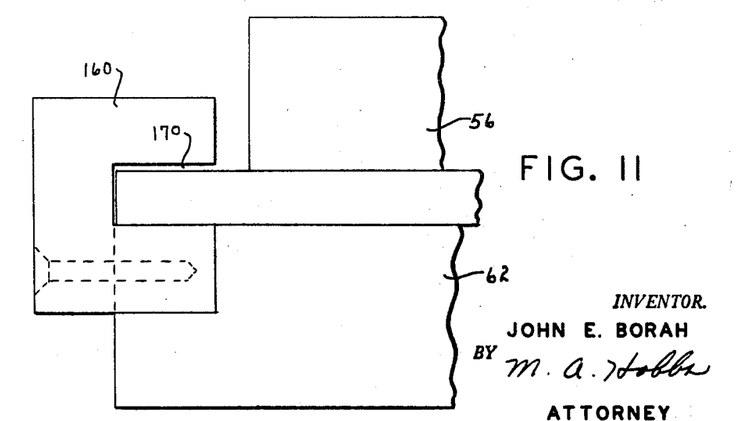
FIGURE 11 is a fragmentary elevational view of the lower section of the mold and the press platen and end elevational view of one of the tracks on which the mold section is removed from the press.

In the embodiment of the invention shown in detail in the drawings, plunger plate 50 is secured to the underside of platen 60 and remains in stationary position throughout the operation of the press. Pot well plate 52 is suspended on four vertical shafts 80, 82, 84 and 86 which are secured to the margin of the respective ends of the plate and extend upwardly through holes in overhanging edges of platen 60 and thence through holes in the respective brackets 88 and 90 secured to opposite ends of head 28 by screws 92 extending through the ends of the bracket and into the metal of the head. The four shafts move freely longitudinally in the holes in the platens and brackets and are held in a preselected lower position when the mold is opened by nuts 102 on the upper ends of the shafts, a second nut preferably being threaded onto the upper ends of the rods to lock nut 102 in place. The position which the shafts occupy when the mold is open is shown in FIGURE 3 and the position when the mold is closed is shown in FIGURE 1. Center section 54 is suspended on a pair of parallel rails 110 and 112 which in turn are suspended on vertical shafts 114 and 116 on opposite ends of the press for track 110, and shafts 118 and 120 on opposite ends of the press for track 112. These four shafts extend upwardly through holes in the overhanging edges of platen 60 and thence through holes in the respective brackets 88 and 90 for free longitudinal movement therethrough, and are held in a preselected lower position when the mold is opened by nuts 122 on the upper ends of the shafts, an additional nut preferably being used to lock to lock nuts 122 in place. Rails 110 and 112 form a track on which center cavity plate section 54 can be slid from its position in the press for molding, as seen in FIGURE 2, to its position completely removed from the press for removal of the molded articles, as seen in FIGURE 7. The rails support section 54 from the time the bottom section 56 is removed therefrom during the opening of the press until the mold is again closed after section 54 has been slid from the press to the position shown in FIGURE 7 and returned to the press ready for the next molding operation. As soon as bottom section 56 picks up section 54 as the press closes, the rails are supported by the marginal edge of section 54.

The construction and design of the rails 110 and 112 and the relationship of the rails to the center cavity plate section are important features of the present invention, each rail in the embodiment shown consisting of a bar of steel extending through the press and outwardly at one end approximately the length of the center section and containing a longitudinal groove 130 extending the full length thereof on the side facing the center section and being of a height substantially equal to the thickness of margin 132 of the center section. Each rail, the construction of which is clearly shown in FIGURES 6 through 10, is sufficiently wide in the portion 134 in the mold that the metal of the rail extends over the margin 132 of section 54 throughout the length thereof while the section is in place in the press for molding, thus giving the necessary support to the center cavity plate section while the mold is being opened, and to the rails while they are being lifted during the press closing operation. The inner edge of portion 136 of each rail is offset inwardly sufficiently that the space between the two rails is greater than the width of the center section with the exception of the widened portion at one end created by opposed lugs 138 and 140. When the center section has been fully withdrawn from the press along rails 110 and 112 it is supported solely by pins 142 and 144 in opposite edges of the section plate, and also by lugs 138 and 140 except while the section is being inverted to the position shown in FIGURE 6.

Figure 6:
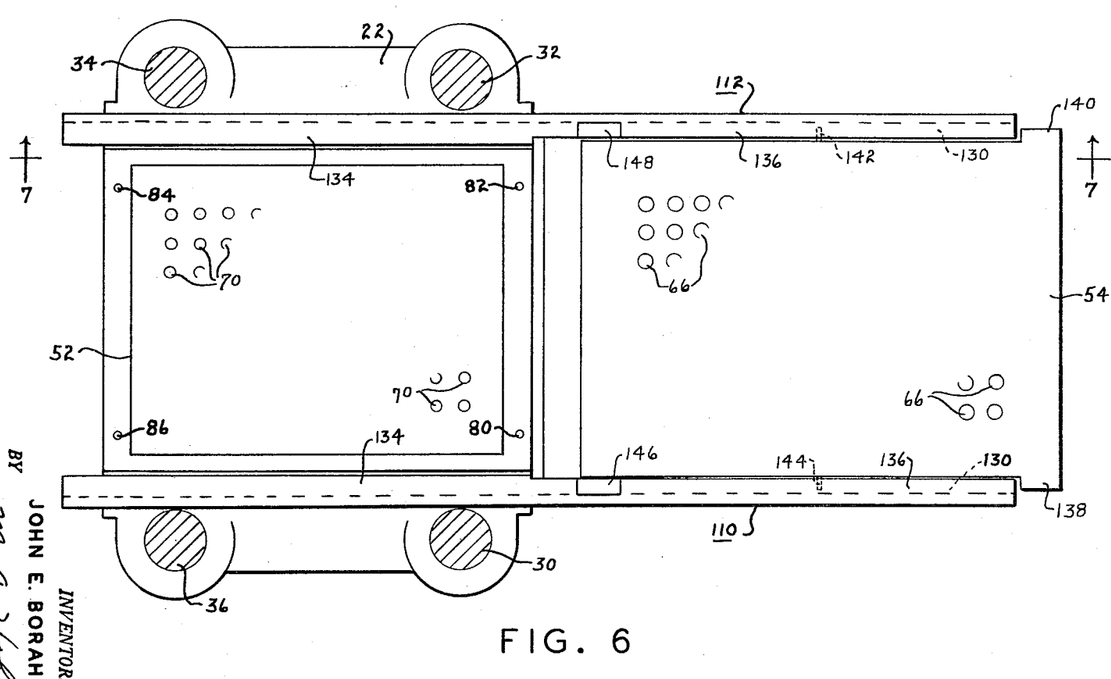
FIGURE 6 is a horizontal cross sectional view of the press and mold apparatus, taken on line 6—6 of FIGURE 3, illustrating the manner in which the section of the mold containing the final molded articles is removed from the press for the purpose of removing the articles from the cavities.

In removing center cavity plate section 54 from the press and inverting it to remove the molded articles from the cavities therein, starting with section 54 fully in the press and with lugs 138 and 140 in the left hand end of the rails as viewed in FIGURE 6, the section is pulled along on the rails until the lugs register with slots 146 and 148 in the upper side of the rails in portion 136. These slots are of sufficient length to permit the lugs to pass freely therethrough when pressure is applied to the opposite end of the section 54, thus permitting the section to rotate on pins 142 and 144 until the section reaches the position shown in FIGURE 6, i.e. with section 54 inverted and positioned horizontally with the lugs extending fully beyond the ends of the rails. The section is then pushed inwardly toward the press until the lugs are in grooves 130 at the end of the rails, the lugs thus retaining the section firmly in its inverted position and giving support to the plate while the molded parts are being removed therefrom. The offset between portions 134 and 136 and slots 146 and 148 permits section 54 to rotate freely between the rails when the section has been withdrawn from the press, as shown in FIGURE 7. To position the center cavity plate section initially when it is returned to the press on the rails, a positive stop means is employed consisting of a block of steel 150 which fits snugly in groove 130, and one or more set screws 152 extending through the rail above or below the block for locking the positive stop block in proper place once the exact position of the center cavity plate section is established for safe and proper closing of the mold.

Figure 12:
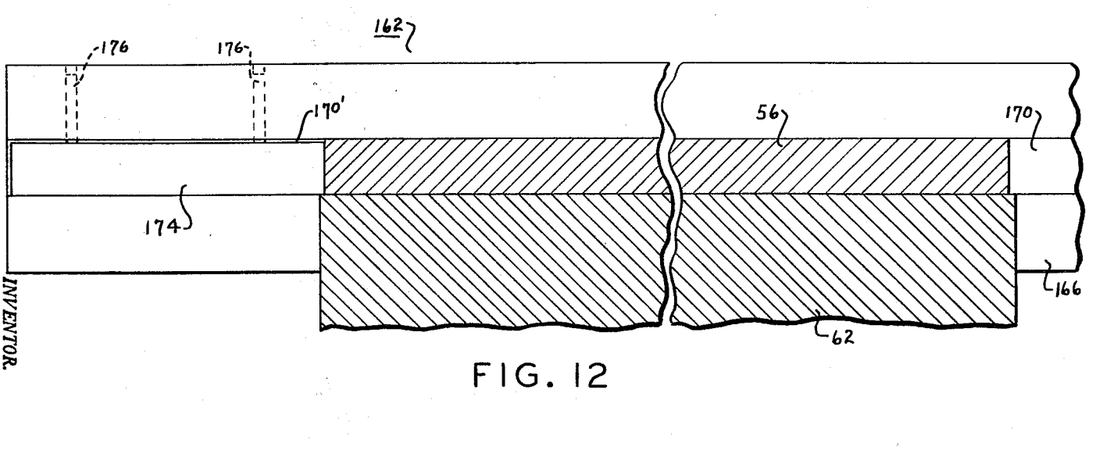
FIGURE 12 is an enlarged fragmentary cross sectional view of a part of the present apparatus taken on line 12—12 of FIGURE 3.

Rails 160 and 162 are provided for removing bottom section 56 of the mold from the press in order to facilitate loading the mold cavities with inserts such as steel rings, beaded chains and annular coil springs as described in my above mentioned copending application. Each rail is secured to platen 62 and extends the full length thereof and outwardly from the press a distance approximately equal to the length of bottom section 56. Since the bottom plate section of the mold must rest on the lower press platen 62 when the bottom section is in the press, the rails are slotted along the lower side to seat over the opposite edges of the lower platen, as shown in FIGURE 12, and form guides for the lower section without giving any actual support thereto. The portion 166 of each rail is constructed to give full support to the bottom section when the section is pulled from the press along the rails, and consists of a bar of steel having an inwardly facing groove 170 in which the marginal edge of the bottom section slides. The bottom section is not inverted when it is removed from the press, as is center section 54, and while the drawings show both pairs of rails 110 and 112, and 160 and 162 extending from the press on the same end, if two operators are working on the press, it would normally be desirable to have the rails 160 and 162 projecting from the press on the end opposite rails 110 and 112 so that the bottom plate can be removed from the press and the cavities thereof loaded with inserts at the same time that the molded articles are being removed from the cavities in center section 54. To position the bottom section initially when it is returned to the press, a stop means similar to the one used in connection with rails 110 and 112 is employed, consisting of a block of steel 174 which fits in groove 170', and set screws 176 extending through the rail above or below the block for locking the block in place after it has been located for the safe and positive positioning of the bottom plate.

While rails 110 and 112 and rails 160 and 162 can be made sufficiently large to constitute the sole support for the respective mold sections when they are pulled from the press along the rails to their fully removed position, extremely heavy mold sections would require large and bulky rails and would increase the initial construction cost of the present apparatus and thereafter the operating and maintenance expense. Consequently, the apparatus is made more versatile by providing supports 180 and 182 for the free ends of the rails 110 and 112 and supports 184 and 186 for the ends of rails 160 and 162, respectively. Each support consists of a cylindrical sleeve 190 supported on the floor by a collar 192 and a rod 194 which telescopes into sleeve 190 and performs the dual purpose of giving lateral support to the rails so that they can not be spread apart accidentally and permit the respective sections to become displaced, and also, in conjunction with a pin 196, forming part of the support means when the mold sections are moved from the press along the rails.

In the operation of the present apparatus shown in the drawings, starting with the mold open and with the desired inserts already in place in the cavities of bottom section 56 and the moldable material on pot well plate 52, the press is hydraulically actuated, causing ram 24 to move upwardly carrying ram plate 26, platen 62 and bottom section 56. When section 56 engages center cavity plate section 54, pins 72 seat in the respective holes of section 54, accurately aligning the two sections and carrying section 54 upwardly until it reaches plate 52, whereupon pins 74 enter the respective holes in section 54 and align plate 52 with the previously aligned sections 56 and 54. The two sections and plate 52 are raised until the mold approaches fully closed position and, with the entrance of pins 76 into the respective holes of plate 52, the mold parts all become fully aligned and the mold is closed and placed under sufficient pressure and temperature to extrude the moldable material into the mold cavities and thereafter to cure the molded articles. The press ram is then withdrawn, pulling the bottom platen downwardly and causing the mold sections and plates to separate and come to rest in their open position shown in FIGURE 3. Section 54 is moved from the press along rails 110 and 112 until lugs 138 and 140 register with slots 146 and 148 and the section is rotated to its inverted position in the manner illustrated in FIGURE 7, and the plate moves toward the press sufficiently to place the lugs in the outer ends of groove 130. The molded articles are removed from the cavities in the section and the section reinverted and slid along the rails into proper position in the press. The bottom section is then moved from the press along rails 160 and 162 until the cavities therein are readily accessible to the operator for loading the metal inserts therein. After the loading operation has been completed, the bottom section is returned to the press, moldable material placed on the pot well plate, and the press operated to close the mold following the same sequence of operation as described above to repeat the molding operation.

In the operation of the present device in conjunction with molds for producing certain types of articles, center section 54 may not readily separate from pot well plate 52 under merely the influence of gravity and the yieldable force created by the lowering and withdrawal of bottom section 56; consequently, under these conditions it is advantageous to employ hydraulic or pneumatic cylinders to move shafts 114, 116, 118 and 120 downwardly as the press is opened and to forcibly separate plate 54 from plate 52 after the latter plate has become fully supported by shafts 80, 82, 84 and 86 as shown in FIGURE 3. Hydraulic or pneumatic cylinders may be mounted on head 28 and connected to the upper ends of shafts 114, 116, 118 and 120 and operated simultaneously with the opening of the press by the ram and conventional plunger return cylinders (not shown). While the shafts supporting plates 52 and 54 will normally move freely through the holes in the respective brackets 88 and 90, it is sometimes preferable to mount the shafts in longitudinal bearings of well known types to eliminate friction and any possibility of the shafts binding in the brackets. The present apparatus may be used in conjunction with additional operating mechanisms and may be modified to utilize only certain parts of the present apparatus, such as rails 110 and 112 without rails 160 and 162.

In the specification and drawings, a transfer type mold having four sections has been used for the purpose of illustrating the invention. The present invention is not limited to transfer molds or to transfer molds with any particular number of sections, but is applicable to compression type molds and is especially useful in the latter type having an intermediate section of substantial weight and thickness. The present apparatus permits the use of large mold sections and molds with a relatively large number and size of cavities. It is readily seen that in the use of the present apparatus in connection with a compression mold having a thick, heavy intermediate section, the latter section can be supported and manipulated by rails 110 and 112 and the apparatus may include the previously described features for inverting the section when it is removed from the press on the two rails.

While a number of variations and modifications in the present mold manipulating apparatus have been desccribed herein, various other changes and modifications may be made without departing from the scope of the invention.

I claim:

1. In a mold manipulating apparatus for use in conjunction with a press having adjacent upper and lower platens and a mold having a top and bottom and upper and lower intermediate sections: a pair of horizontally disposed tracks movable vertically and relative to both said adjacent platens and spaced laterally from one another and extending from the press, means suspending said tracks between said upper and lower platens in spaced relation thereto for determining the downward travel of said tracks, the lower intermediate mold section having a portion supported by said tracks and movable from a position between said top and bottom mold sections to a position beyond the press, means operatively connected to said upper intermediate mold section for determining the downward travel of said upper section to a point spaced above said lower intermediate section, means on said portion for rotating said lower mold section to an inverted position when it is removed from the press, and means for locking said section selectively in its normal position and in its inverted position.

2. In a mold manipulating apparatus for use in conjunction with a press having adjacent upper and lower platens and a mold having a top and bottom and upper and lower intermediate sections: a pair of horizontally disposed tracks movable vertically and relative to both said adjacent platens and spaced laterally from one another and extending from the press, means suspending said tracks between said upper and lower platens in spaced relation thereto for determining the downward travel of said tracks, the lower intermediate mold section having a portion supported by said tracks and movable from a position between said top and bottom mold sections to a position beyond the press, means operatively connected to said upper intermediate mold section for determining the downward travel of said upper section to a point spaced above said lower intermediate section, and means on said portion for rotating said lower mold section to an inverted position when it is removed from the press.

3. In a mold manipulating apparatus for use in conjunction with a press having adjacent upper and lower platens and a mold having a top and bottom and upper and lower intermediate sections: a pair of horizontally disposed tracks movable vertically and relative to both said adjacent platens and spaced laterally from one another and extending from the press, means suspending said tracks between said upper and lower platens in spaced relation thereto for determining the downward travel of said tracks, the lower intermediate mold section having a portion supported by said tracks and movable from a position between said top and bottom mold sections to a position beyond the press, and means operatively connected to said upper intermediate mold section for determining the downward travel of said upper section to a point spaced above said lower intermediate section.

4. In a mold manipulating apparatus for use in conjunction with a press having adjacent upper and lower platens and with a mold having a top and bottom and intermediate sections: a pair of horizontally disposed tracks movable vertically and relative to both said adjacent platens and spaced laterally from one another and extending from the press, and means suspending said tracks between said upper and lower platens in spaced relation thereto for determining the downward travel of said tracks, the intermediate mold section having a portion supported by said tracks and movable from a position between said top and bottom mold sections to a position beyond the press.

5. A mold manipulating apparatus for use in conjunction with a hydraulic press having a vertically movable ram and a stationary head above the ram and platens operatively connected to said ram and head and with a mold having a top and bottom and upper and lower intermediate sections, comprising a pair of parallel rails mounted on opposite sides of said ram platen and extending from the press and having facing grooves, the lower surface of which is on a plane with the upper surface of the ram platen, said bottom mold section having a portion extending into the grooves of the two rails and movable from a position directly above said ram platen to a position beyond the press, a pair of horizontally disposed vertically movable rails spaced laterally from one another above said first mentioned rails and extending from the press and having facing grooves, a pair of vertical shafts spaced along each of said second mentioned rails and extending upwardly on opposite sides of the press along the head thereof, bracket means mounted on opposite sides of the head and having vertical holes therein for receiving said shafts for longitudinal movement therethrough, stop means on the upper ends of said shafts for determining the position of said second mentioned rails when the press is in open position, the lower intermediate mold section having a plate-like portion supported by said rails extending into the grooves of the two second mentioned rails and movable from a position between said top and bottom mold sections to a position beyond the press, each of said second mentioned rails having a relatively wide portion within the press and a relatively narrow portion beyond the press on the side containing the grooves and a slot in said narrow portion extending vertically from the upper surface to the groove therein, said plate-like portion being wider than the space between the second mentioned rails at the wide portion and narrower than the space between said second mentioned rails at the narrow portion and having a lug at corresponding ends of each side adapted to slide in the respective groove and to pass through the respective slot and a pin on each side near the center and slidable in the respective groove for pivoting the intermediate section, a pair of vertical shafts at each end of the upper intermediate mold section extending upwardly on opposite sides of the press and extending through holes in said bracket means for longitudinal movement therethrough, and stop means on the upper end of said last mentioned shafts for retaining said upper intermediate mold section in spaced relation to said lower intermediate mold section when the press is in open position.

6. A mold manipulating apparatus for use in conjunction with a hydraulic press having a vertically movable ram, a stationary head above the ram, and platens operatively connected to said ram and head, and with a mold having a top and bottom and upper and lower intermediate sections, comprising a pair of horizontally disposed vertically movable rails spaced laterally from one another and extending from the press and having facing grooves, a pair of vertical shafts spaced along each of said rails and extending upwardly on opposite sides of the press along the head thereof, bracket means mounted on opposite sides of the head and having vertical holes therein for receiving said shafts for longitudinal movement therethrough, stop means on the upper ends of said shafts for determining the position of said rails when the press is in open position, the lower intermediate mold section having a plate-like portion extending into the grooves of the two rails and movable from a position between said top and bottom mold sections to a position beyond the press, each of said rails having a relatively wide portion within the press and a relatively narrow portion beyond the press on the side containing the grooves and a slot in said narrow portion extending vertically from the upper surface to the groove therein, said plate-like portion being wider than the space between the rails at the wide portion and narrower than the space between said rails at the narrow portion and having a lug at corresponding ends of each side adapted to slide in the respective groove and to pass through the respective slot and a pin on each side near the center and slidable in the respective groove for pivoting the intermediate section, a pair of vertical shafts at each end of the upper intermediate mold section extending upwardly on opposite sides of the press and extending through holes in said bracket means for longitudinal movement therethrough, and stop means on the upper end of said last mentioned shafts for retaining said upper intermediate mold section in spaced relation to said lower intermediate mold section when the press is in open position.

7. A mold manipulating apparatus for use in conjunction with a press having a vertically movable ram, a stationary head above the ram, and platens secured to said ram and head, and with a mold having a top and bottom and intermediate sections, comprising a pair of horizontally disposed vertically movable rails spaced laterally from one another and extending from the press and having facing grooves, a pair of vertical shafts spaced along each of said rails and extending upwardly on opposite sides of the press along the head thereof, bracket means mounted on opposite sides of the head and having vertical holes therein for receiving said shafts for longitudinal movement therethrough, stop means on the upper ends of said shafts for determining the position of said rails when the press is in open position, the intermediate mold section having a plate-like portion extending into the grooves of the two rails and movable from a position between said top and bottom mold sections to a position beyond the press, each of said rails having a relatively wide portion within the press and a relatively narrow portion beyond the press on the side containing the grooves and a slot in said narrow portion extending vertically from the upper surface to the groove therein, said plate-like portion being wider than the space between the rails at the wide portion and narrower than the space between said rails at the narrow portion and having a lug at corresponding ends of each side adapted to slide in the respective groove and to pass through the respective slot and a pivot means on each side near the center and slidable in the respective grooves for pivoting the intermediate section, stop means in each of said grooves for positioning said intermediate mold section upon its return to its position in the press, and telescopic cylindrical means connected to the outer ends of said rails for supporting the rails when the press is open.

8. A mold manipulating apparatus for use in conjunction with a press having a vertically movable ram and a stationary head above the ram, and with a mold having a top and bottom and intermediate sections, comprising a pair of horizontally disposed vertically movable rails spaced laterally from one another and extending from the press and having facing grooves, a pair of vertical shafts spaced along each of said rails and extending upwardly on opposite sides of the press along the head thereof, bracket means mounted on opposite sides of the head and having vertical holes therein for receiving said shafts for longitudinal movement therethrough, and stop means on the upper ends of said shafts for determining the position of said rails when the press is in open position, the intermediate mold section having a plate-like portion extending into the grooves of the two rails and movable from a position between said top and bottom mold sections to a position beyond the press, each of said rails having a relatively wide portion within the press and a relatively narrow portion beyond the press on the side containing the grooves and a slot in said narrow portion extending vertically from the upper surface to the groove therein, said plate-like portion being wider than the space between the rails at the wide portion and narrower than the space between said rails at the narrow portion and having a lug at corresponding ends of each side adapted to slide in the respective groove and to pass through the respective slot, and a pivot means on each side near the center and slidable in the respective groove for pivoting the intermediate section.

9. A mold manipulating apparatus for use in conjunction with a press having a vertically movable ram, and a stationary head above the ram, and with a mold having a top and bottom and upper and lower intermediate sections, comprising a pair of horizontally disposed vertically movable rails spaced laterally from one another and extending from the press and having facing grooves, a pair of vertically movable shafts spaced along and secured to each of said rails and extending upwardly on opposite sides of the press along the head thereof for suspending said rails between said top and bottom mold sections in spaced relation thereto and laterally therefrom, bracket means mounted on opposite sides of the head and having vertical holes therein for receiving said shafts for longitudinal movement therethrough, stop means on the upper ends of said shafts for determining the position of said rails when the press is in open position, the lower intermediate mold section having a plate-like portion extending into the grooves of the two rails and movable from a position between said top and bottom mold sections to a position beyond the press, a pair of vertically movable shafts at each end of the upper intermediate mold section extending upwardly on opposite sides of the press and extending through holes in said bracket means for longitudinal movement therethrough, and stop means on the upper end of said last mentioned shafts for retaining said upper intermediate mold section in spaced relation to said lower intermediate mold section when the press is in open position.

10. A mold manipulating apparatus for use in conjunction with a press having a vertically movable ram, a stationary head above the ram, and platens operatively connected to said ram and head, and with a mold having a top and bottom and intermediate sections, comprising a pair of parallel rails mounted on said ram platen and extending from the press and beyond the edge of said ram platen and having facing grooves, the lower surface of which is on a plane with the upper surface of the ram platen, said bottom mold section having a portion extending into the grooves of the two rails and movable from a position directly above said ram platen to a position beyond the press, a pair of horizontally disposed vertically movable rails spaced laterally from one another above said first mentioned rails and extending from the press and having facing grooves, a pair of vertical shafts spaced along each of said second mentioned rails and extending upwardly on opposite sides of the press along the head thereof for suspending said rails between said top and bottom mold sections in spaced relation thereto and laterally therefrom, means mounted on opposite sides of the head and having vertical holes therein for receiving said shafts for longitudinal movement therethrough, and stop means on the upper ends of said shafts for determining the position of said second mentioned rails when the press is in open position, the intermediate mold section having a plate-like portion extending into the grooves of the two second mentioned rails and movable from a position between said top and bottom mold sections to a position beyond the press.

11. A mold manipulating apparatus for use in conjunction with a press having vertically movable ram, a stationary head above the ram, and platens secured to said ram and head, and with a mold having a top and bottom and upper and lower intermediate sections, comprising a pair of parallel rails mounted on opposite sides of said ram platen and extending from the press and beyond the edge of said ram platen and having facing grooves, the lower surface of which is on a plane with the upper surface of the ram platen, said bottom mold section having a portion extending into the grooves of the two rails and movable from a position directly above said ram platen to a position beyond the press, a pair of horizontally disposed vertically movable rails spaced laterally from one another and extending from the press and having facing grooves, a pair of vertical shafts spaced along each of said second mentioned rails and extending upwardly on opposite sides of the press along the head thereof for suspending said rails between said top and bottom mold sections in spaced relation thereto and laterally therefrom, bracket means mounted on opposite sides of the head and having vertical holes therein for receiving said shafts for longitudinal movement therethrough, stop means on the upper ends of said shafts for determining the position of said second mentioned rails when the press is in open position, the lower intermediate mold section having a plate-like portion extending into the grooves of the two second mentioned rails and movable from a position between said top and bottom mold sections to a position beyond the press, a pair of vertical shafts at each end of the upper intermediate mold section extending upwardly on opposite sides of the press and extending through holes in said bracket means for longitudinal movement therethrough, and stop means on the upper end of said last mentioned shafts for retaining said upper intermediate mold section in spaced relation to said lower intermediate mold section when the press is in open position.

References Cited by the Examiner

UNITED STATES PATENTS

| | | | |
|---|---|---|---|
| 1,387,617 | 8/1921 | Roberts | 18—19 |
| 1,737,143 | 11/1929 | Burnham | 18—17 |
| 1,993,942 | 3/1935 | Novotny | 18—17 |
| 2,239,248 | 4/1941 | Rieser | 18—16 |
| 2,289,102 | 7/1942 | Clark | 18—16 |
| 2,412,671 | 12/1946 | Brunner | 18—17 |
| 2,586,474 | 2/1952 | Moore | 18—16 X |
| 2,983,953 | 5/1961 | Borah | 18—16 |

J. SPENCER OVERHOLSER, *Primary Examiner.*

MICHAEL V. BRINDISI, *Examiner.*

W. J. STOFFEL, W. L. McBAY, *Assistant Examiners.*